US011561760B2

(12) United States Patent
Kim et al.

(10) Patent No.: US 11,561,760 B2
(45) Date of Patent: Jan. 24, 2023

(54) ELECTRONIC DEVICE AND METHOD OF CONTROLLING THEREOF

(71) Applicant: Samsung Electronics Co., Ltd., Suwon-si (KR)

(72) Inventors: Jaehong Kim, Suwon-si (KR); Sangkyung Lee, Suwon-si (KR); Jihak Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 202 days.

(21) Appl. No.: 16/435,988

(22) Filed: Jun. 10, 2019

(65) Prior Publication Data

US 2019/0384569 A1 Dec. 19, 2019

Related U.S. Application Data

(60) Provisional application No. 62/685,551, filed on Jun. 15, 2018.

(30) Foreign Application Priority Data

Nov. 19, 2018 (KR) ........................ 10-2018-0142688

(51) Int. Cl.
*G10L 17/00* (2013.01)
*G10L 15/02* (2006.01)
(Continued)

(52) U.S. Cl.
CPC .............. *G06F 3/167* (2013.01); *G10L 15/02* (2013.01); *G10L 15/22* (2013.01); *G10L 2015/223* (2013.01)

(58) Field of Classification Search
CPC .... G06F 3/167; G09F 27/00; H04M 2201/40; H04M 2250/74
(Continued)

(56) References Cited

U.S. PATENT DOCUMENTS 8,165,409 B2 4/2012 Ritzau et al.
8,949,123 B2 2/2015 Garg et al.
(Continued)

FOREIGN PATENT DOCUMENTS

JP 2006-235712 A 9/2006
KR 10-1998-0040701 A 8/1998
(Continued)

OTHER PUBLICATIONS

International Search Report and Written Opinion dated Sep. 24, 2019, issued in an International application No. PCT/KR2019/006876.

(Continued)

*Primary Examiner* — George C Monikang
(74) *Attorney, Agent, or Firm* — Jefferson IP Law, LLP

(57) ABSTRACT

An electronic device for changing a voice of a personal assistant function, and a method therefor are provided. The electronic device includes a display, a transceiver, processor, and a memory for storing commands executable by the processor. The processor is configured to, based on a user command to request acquisition of voice data feature of a person included in a media content displayed on the display being received, control the display to display information of a person, based on a user input to select the one of the information of a person being received, acquire voice data corresponding to an utterance of a person related to the selected information of a person, and acquire voice data feature from the acquired voice data, control the transceiver to transmit the acquired voice data feature to a server.

18 Claims, 11 Drawing Sheets

(51) Int. Cl.
  *G06F 3/16* (2006.01)
  *G10L 15/22* (2006.01)
(58) Field of Classification Search
  USPC .................................................. 704/200, 246
  See application file for complete search history.

(56) References Cited

U.S. PATENT DOCUMENTS

| | | |
|---|---|---|
| 9,129,602 B1 | 9/2015 | Shepard et al. |
| 9,514,748 B2 | 12/2016 | Reddy et al. |
| 9,716,836 B2 | 7/2017 | Jung et al. |
| 9,830,903 B2 | 11/2017 | Mason |
| 9,967,724 B1 | 5/2018 | Gan et al. |
| 9,990,176 B1 | 6/2018 | Gray |
| 10,045,086 B1* | 8/2018 | Lin ..................... H04N 21/239 |
| 2002/0035475 A1* | 3/2002 | Yoda ..................... G10L 15/24 |
| | | 704/E15.041 |
| 2005/0064374 A1 | 3/2005 | Spector |
| 2008/0270344 A1 | 10/2008 | Yurick et al. |
| 2009/0052713 A1* | 2/2009 | Abe ..................... H04R 1/083 |
| | | 381/355 |
| 2010/0219936 A1 | 9/2010 | Gabara |
| 2010/0284617 A1* | 11/2010 | Ritzau ................ G06V 30/142 |
| | | 382/181 |
| 2012/0102066 A1 | 4/2012 | Eronen et al. |
| 2012/0116772 A1 | 5/2012 | Jones et al. |
| 2013/0044921 A1* | 2/2013 | In ......................... G06F 16/532 |
| | | 715/810 |
| 2013/0182182 A1 | 7/2013 | Mountain |
| 2015/0134456 A1 | 5/2015 | Baldwin |
| 2015/0339098 A1* | 11/2015 | Lee ..................... G06F 3/017 |
| | | 715/728 |
| 2017/0347143 A1 | 11/2017 | Limp et al. |
| 2019/0222798 A1* | 7/2019 | Honma ............... G10L 21/0272 |

FOREIGN PATENT DOCUMENTS

| | | |
|---|---|---|
| KR | 10-2014-0055515 A | 5/2014 |
| KR | 10-2016-0116385 A | 10/2016 |
| WO | 2008-097051 A | 8/2008 |

OTHER PUBLICATIONS

European Search Report dated Mar. 18, 2021; European Appln No. 19820314.3-1203 / 3762819 PCT/KR2019006876.

* cited by examiner

FIG. 4
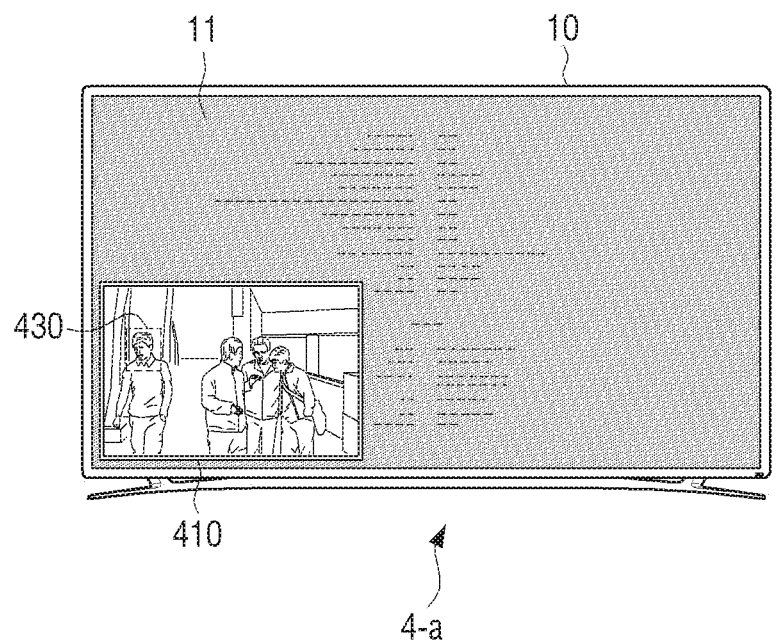
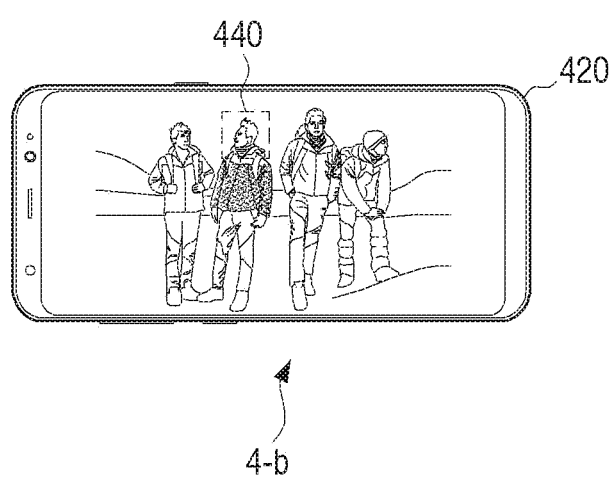

ELECTRONIC DEVICE AND METHOD OF CONTROLLING THEREOF

CROSS-REFERENCE TO RELATED APPLICATION(S)

This application is based on and claims priority under 35 U.S.C. § 119(e) of a U.S. Provisional application Ser. No. 62/685,551, filed on Jun. 15, 2018, in the U.S. Patent and Trademark Office, and under 35 U.S.C. § 119(a) of a Korean patent application number 10-2018-0142688, filed on Nov. 19, 2018, in the Korean Intellectual Property Office, the disclosure of which is incorporated by reference herein in its entirety.

BACKGROUND

1. Field

The disclosure relates to an electronic device to change a voice of a personal assistant function.

2. Description of Related Art

In addition to a traditional input method using a keyboard or a mouse, recent electronic devices may support various input methods such as a voice input. For example, an electronic device such as a smartphone or a tablet may recognize a user's voice inputted while an artificial intelligence (AI) personal assistant function is executed, execute an operation corresponding to the voice input, or provide a search result.

The AI personal assistant function has been developed based on technology for processing a natural language. The technology for processing a natural language is for grasping an intention of a user utterance and providing a user with a result corresponding to the intention.

In this case, the electronic device may provide a result using a display or provide a result by a voice.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of outputting a changed voice to correspond to a user's intention when an electronic device receives a user utterance using an artificial intelligence (AI) personal assistant function and outputs an operation corresponding thereto as a voice.

Another aspect of the disclosure is to provide a method for outputting voice of an AI personal assistant as different voices for individual users, when the electronic device is a general-use device.

Additional aspects will be set forth in part in the description which follows and, in part, will be apparent from the description, or may be learned by practice of the presented embodiments.

In accordance with an aspect of the disclosure, an electronic device is provided. The electronic device includes a display, a transceiver, processor, and a memory for storing commands executable by the processor. The processor is configured to, based on a user command to request acquisition of voice data of a person included in a media content displayed on the display being received, display at least one information of a person by controlling the display, based on a user input to select the one of the at least one information of a person being received, acquire voice data corresponding to an utterance of a person related to the selected information of a person, and acquire voice data feature from the acquired voice data, control the transceiver, and transmit the acquired voice data feature to a server.

In accordance with another aspect of the disclosure, a controlling method of an electronic device is provided. The controlling method includes displaying at least one information of a person on a display of the electronic device, based on receiving a user command to request acquisition of a voice data feature of a person included in a media content displayed on a display, acquiring voice data corresponding to an utterance of a person related to the information of the person selected, based on receiving a user input to select one of the at least one information of a person, acquiring voice data feature from the acquired voice data, and transmitting the voice data feature to a server.

According to an embodiment of the disclosure, the electronic device may change the voice of a person appearing in the media content which a user is watching as a voice of the AI personal assistant.

According to an embodiment of the disclosure, the electronic device may divide utterances of each user and output different voices of AI personal assistants in accordance with divided users.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a view to describe a situation of providing another media content for acquiring voice data feature by an electronic device or acquiring voice data feature by another electronic device according to an embodiment of the disclosure;

The same reference numerals are used to represent the same elements throughout the drawings.

DETAILED DESCRIPTION

Figure 1:
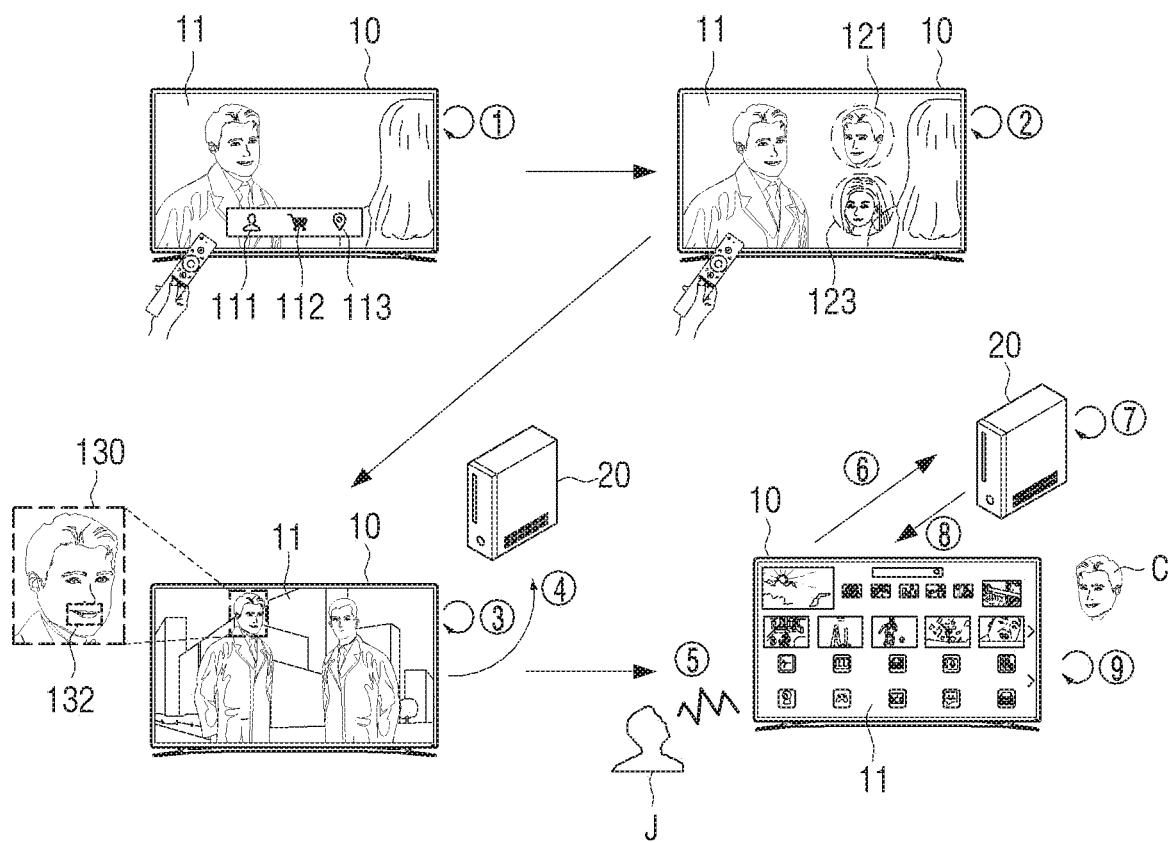
FIG. 1 is a view illustrating a state in which a voice of an artificial intelligence (AI) personal assistant function using an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used in this disclosure is for the purpose of describing particular embodiments only and is not intended to be limiting of the disclosure. The singular forms include plural referents unless the context clearly dictates otherwise. In the specification, when a part is "connected to" another part, it is not only the case where a part is "directly connected", but also is "electrically connected" to the other element by interposing another element therebetween. In addition, when a certain part is referred to as "including" a certain element, which is not intended to exclude other components unless specifically stated otherwise, but may further comprise other components.

In this disclosure, the terms "the" and similar infinitive makers as used in the claims, may be directed to both the singular and the plural. Moreover, unless a recitation explicitly specifies the order of operations describing a method according to the disclosure, the described operations can be performed in a suitable order. The disclosure is not limited according to the order of the operations of the operations described.

The appearances of the phrase "in some embodiments" or "in one embodiment" in various places in the specification are not necessarily all referring to the same embodiment.

Some embodiments of the disclosure may be represented by functional block configurations and various processing operations. Some or all of these functional blocks may be implemented in various numbers of hardware and/or software configurations that perform particular functions. For example, the functional blocks of the disclosure can be implemented by one or more microprocessors, or can be implemented by circuit configurations for a given function. Also, for example, the functional blocks of the disclosure can be implemented in various programming or scripting languages. The functional blocks can be implemented as an algorithm executed in one or more processors. In addition, the disclosure can employ techniques for electronic environment setting, signal processing, and/or data processing of the related art. The terms "mechanism," "element," "means," and "configuration" can be used broadly, and are not limited to mechanical and physical configurations.

In addition, the connection lines or connecting members between the components shown in the drawings are functional connections and/or physical or circuit connections. In an actual device, connection among elements may be represented by various functional connection, physical connection, or circuitry connection which are added or may be replaced.

Herein below, the disclosure will be described in detail with reference to accompanying drawings.

FIG. 1 is a view illustrating a state in which a voice of an artificial intelligence (AI) personal assistant function using an electronic device according to an embodiment of the disclosure.

According to an embodiment, the electronic device 10 may be a video display device (for example, a television (TV)) which is capable of processing a video signal received from the outside and visually displaying the processed video, but the embodiment is not limited thereto, and the electronic device 10 may be implemented with a device including a memory and a processor. For example, the electronic device 10 may be implemented as various video display devices such as a mobile phone, a smartphone, a tablet personal computer (PC), a digital camera, a camcorder, a laptop computer, a tablet PC, a desktop, an e-book terminal, a digital broadcasting terminal, a personal digital assistant (PDA), a portable multimedia player (PMP), an MP3 player, a wearable device, or the like.

According to an embodiment, the electronic device 10 may provide a service which is necessary to a user through an application (or, an application program) (for example: a notification application, a message application, a photo (gallery) application, etc.) stored inside the electronic device 10. For example, the electronic device 10 may execute and operate one or more other applications through an intelligent application (or voice recognition application) stored inside the electronic device 10. The electronic device 10 may receive a user input to execute and operate one or more applications through the intelligent application. That is, the user input may be received through a physical button, a touch pad, a voice input, a remote input, or the like.

The AI personal assistant may mean that, for example, the electronic device 10 executes an application by receiving a user utterance and generating a command to operate the application based on the user utterance.

According to an embodiment, the electronic device 10, in link with at least one or more servers, may execute the AI personal assistant function. For example, a server 20 may receive a voice input of a user from the electronic device 10 through a communication network and change the voice input to text data. The server 20, based on the text data, may generate (or select) a path rule. The path rule may include information on an action (or operation) to perform a function of the application or information on parameter required to execute the action. The path rule may include an order of action of the application. The electronic device 10 may receive the path rule, select an application according to the path rule, and execute an action included in the path rule in the selected application.

According to an embodiment, the term "path rule" may mean sequence of states for the electronic device 10 to perform a task requested by a user, but is not limited thereto. In other words, the path rule may include information on sequence of the states. A task may represent, for example, a specific action which the intelligent application may provide. The task may include generating a schedule, transferring a photo to a desired other party, or providing weather information. The electronic device 10 may perform a task by sequentially including at least one state (for example: action state of the electronic device 10).

According to an embodiment of the disclosure, the path rule may be provided or generated by a rule-based model or AI system. The AI system may be a rule-based system or a neural network-based system (for example, a feedforward neural network (FNN), a recurrent neural network (RNN)). Alternatively, the AI system may be a combination of the above or any other AI system. According to one embodiment, the path rule may be selected from a set of predefined path rules or generated in real time, in response to a user request. For example, the AI system may select at least one path rule among a plurality of predefined path rules, or generate the path rule dynamically (or in real time).

According to various embodiments, the electronic device 10 may perform the aforementioned action of the server 20 by the electronic device 10. That is, the electronic device 10 may convert the user utterance to a text and generate (or select) the path rule based thereon. In accordance with situations, the electronic device 10 may, in parallel or sequentially, generate the path rule by the electronic device 10 or receive the generated path rule by the server 20.

According to an embodiment of the disclosure, the electronic device 10 may execute the action and display a screen corresponding to the state of the electronic device 10 performing the action on a display. For another example, the electronic device 10 may execute the action and may not display the result of performing the action on a display. The electronic device 10 may, for example, execute a plurality of actions, and display only a partial result of the plurality of actions on the display. The electronic device 10, for example, may display only the result of executing the action of the last order on the display. In another example, the electronic device 10 may receive a user input and display the result of executing the action on the display.

According to various embodiments, the electronic device 10 may execute the action, and output the result of performing the action as a voice by using a speaker. For example, the electronic device 10 may output a voice which guides a content in relation to the application before, during, or after executing an application.

Referring to FIG. 1, the electronic device 10 may change a voice outputted from the personal assistant function as described above.

Referring to action ①, the electronic device 10 may receive a user command to request acquisition of voice data feature of a person included in the media content displayed on a display 11.

For example, the electronic device 10 may execute an application for searching for information related to various objects included in the media content and display at least one information search objects on the display 11.

According to various embodiments, the electronic device 10 may display a first information search object 111, a second information search object 112, and a third information search object 113. The first information search object 111 may be, for example, a search object for information of a person. The second information search object 112 may be, for example, a product information search object. The third information search object 113 may be, for example, a place information search object.

Referring to action ②, the electronic device 10 may display at least one information of a person on the display 11, in response to the user input to select the search object for information of a person 111.

For example, the electronic device 10 may acquire information of a person included in the media content using automatic content recognition (ACR) technology. The information of a person may include, for example, an image of the person, a name of the person, a profile of the person, a frequency of emergence of the person in the media content, and the like. The electronic device 10, for example, may display a name or image of a person on the display 11 in a descending order of frequency of emergence. In action ②, the electronic device 10 may display an image 121 of a person C and an image 123 of a person D on the display 11 using the frequency of emergency (i.e., emergence), but is not limited thereto. For example, the electronic device 10 may display a name of the person C and a name of the person D on the display 11.

A user input for selecting the search object for information of a person 111 may mean, for example, selecting the search object for information of a person 111 using a remote controller or other electronic devices for controlling the electronic device 10. However, the input method for selecting the search object for information of a person 111 is not limited thereto.

Referring to action ③, when receiving a user input for selecting one among at least one or more information of a person displayed on the display 11, the electronic device 10 may obtain voice data corresponding to the time point of utterance of the person associated with the selected information of a person.

For example, when the user input to select the image 121 of the person C is received, the electronic device 10 may obtain the feature related to the person C. The electronic device 10 may obtain the feature points of the face (for example, position, shape, arrangement of the eyes, nose, and mouth, or the like) in the image 121 of the person C.

Using the obtained feature points of the face, the electronic device 10 may identify a scene in which the person C appears during the playback of the media content. When the person C appears, the electronic device 10 may recognize a face 130, and identify an utterance period of the person C using a change of a mouth shape 132 of the person C. The electronic device 10 may obtain the voice data outputted by the media content while the person C is giving utterance.

According to an example, the electronic device 10 may obtain the voice data feature from the acquired voice data. The voice data feature may be at least one of, for example, a voice frequency, a kind of voice, a sound velocity, and a pitch. The electronic device 10, for example, may obtain a voice data feature from the voice data of the person C.

Referring to action ④, the electronic device 10 may transmit the acquired voice data feature to the server 20. The server 20 may store a personal account of a user to support the personal assistant function. By this, the server 20 may support such that the user may use the personal assistant function through various electronic devices (for example, a smartphone, a tablet PC, an AI speaker, etc.). The server 20 may store the voice data feature transmitted from the electronic device 10 to correspond to the user account. The electronic device 10 may, for example, store the voice data feature of the person C to correspond to the user account.

Referring to action ⑤, the electronic device 10 may obtain utterance of the user J. For example, the electronic device 10 may obtain the utterance of the user J requesting the search of a specific media content.

Referring to action ⑥, the electronic device 10 may transmit the obtained utterance to the server 20.

Referring to action ⑦, the server 20 may change the obtained utterance to text data, and based on the text data, generate the path rule to proceed the search of the specific media content designated by the user J. The server 20 may search for the media content designated by a user using another server providing the media content to the electronic device 10.

According to an embodiment, the server 20 may generate voice data indicating that the search is currently in progress to the user J and transmit the voice data to the electronic device 10. In this case, the server 20 may generate the output voice data using the voice data feature obtained from action ④ and transmit the voice data to the electronic device 10.

For example, the server 20 may generate the output voice data indicating that the search is currently in progress using the voice data feature of the person C stored in the personal account of the user J and transmit the voice data to the electronic device 10. The electronic device 10 may output the received output voice data.

Referring to action ⑧ the server 20 may transfer the searched result to the electronic device 10.

In this case, the server 20 may generate the voice data for output (hereinafter, output voice data) indicating that the search result is being displayed on the display 11, using the voice data feature of the person C stored to correspond to the personal account of the user J and transmit the voice data to the electronic device.

Referring to action ⑨ the electronic device 10 may display the obtained search result on the display 11.

In this case, the electronic device 10 may output the output voice data indicating that the search result is being displayed on the display 11 as the voice of the person C simultaneously with the display of the search result or sequentially.

According to various embodiments, in a situation of outputting the voice of the person C, the electronic device 10 may display a face image of the person C on the display 11.

According to various embodiments, the electronic device 10 may perform the action of the server 20 described above in the electronic device 10. That is, the electronic device 10 may obtain the voice data feature from the voice data and store the voice data feature to correspond to the personal account of the user J. The electronic device 10 may generate the path rule to correspond to the utterance of the user J and perform a function corresponding to the path rule. The electronic device 10 may generate the output voice data using the voice data feature which is stored to be matched to operations of performing the functions and output the voice data using a microphone.

As described above, according to an embodiment of the disclosure, the electronic device 10 may apply the voice of the person included in the media content to the personal assistant function of the user along with the server 20 supporting the personal assistant function. Using one embodiment of the disclosure, the user may use the personal assistant function to suit for a personal tendency of a user more.

Figure 2:
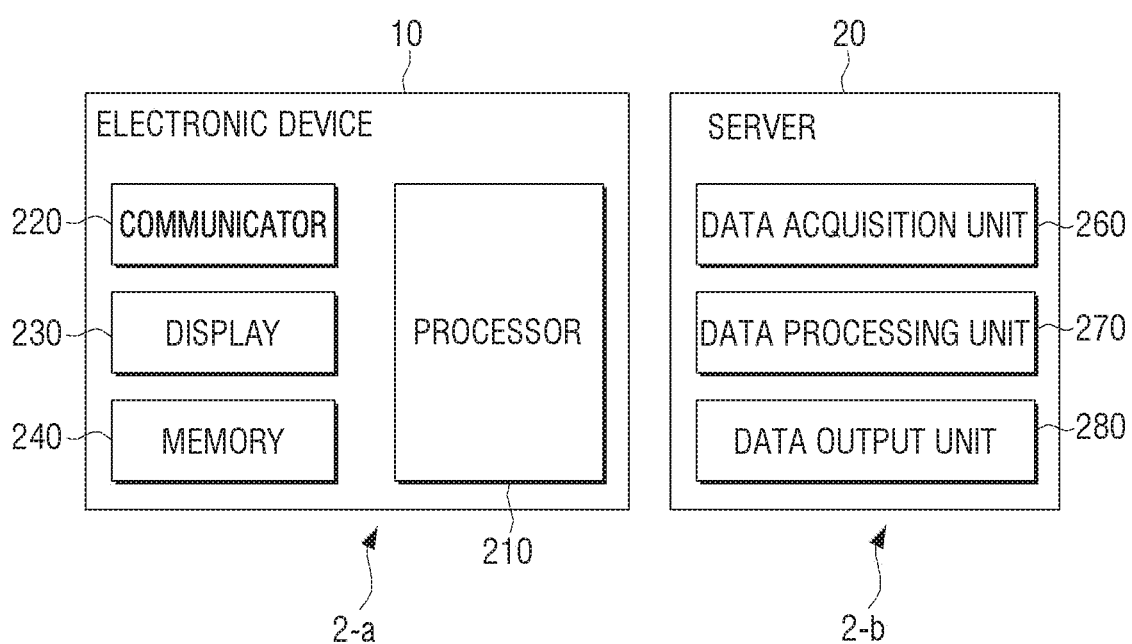
FIG. 2 is a schematic block diagram of the electronic device and the server according to an embodiment of the disclosure.

FIG. 2 is a schematic block diagram of the electronic device and the server according to an embodiment of the disclosure.

Referring to 2-a of FIG. 2, the electronic device 10 may include a processor 210, a communicator 220 (e.g., a transceiver), a display 230, and a memory 240, but is not limited thereto. The electronic device 10 may omit a part of the components or include additional components.

According to an embodiment, the processor 210 may execute a program stored in the memory 240 by controlling the memory 240 and retrieve or store necessary information.

For example, the processor 210 may receive a user command to request acquisition of the voice data feature of the person included in the media content displayed on the display 230, display at least one information of a person on the display 230 in response to the user command, and when the user input to select one of the displayed at least one information of a person is received, acquire the voice data corresponding to the utterance of the person relating to the selected information of a person, acquire the voice data feature from the acquired voice data, and transmit the voice data feature to the server.

According to an embodiment, the communicator 220 may connect the electronic device 10 with an external device by the control of the processor 210. The communicator 220 may include one of the components which implement various wired or wireless communication methods such as wireless local area network (LAN), Bluetooth, and wired Ethernet, or the like, to correspond to the function and structure of the electronic device 10.

According to one embodiment, the display 230 may display an image, a video, and/or an execution screen of an application. The display 230 may include the display 11 of FIG. 1. When the display 230 is implemented as a touch screen display, the display 230 may be used as an input device, besides an output device. The display 230 may include at least one of a liquid crystal display, a thin film transistor-liquid crystal display, an organic light-emitting diode, a flexible display, a three-dimensional display, an electrophoretic display, and the like.

According to one embodiment, the memory 240 may include at least one storing medium among a memory of a flash memory type, a hard disk type, a multimedia card micro type, a card type memory (for example, SD or XD memory), a random access memory (RAM), static random access memory (SRAM), a read-only memory (ROM), an electrically erasable programmable read-only memory (EEPROM), a programmable read-only memory (PROM), a magnetic memory, a magnetic disk, or an optical disk.

Referring to 2-b of FIG. 2, the server 20 may include a data acquisition unit 260, a data processing unit 270, and a data output unit 280. The server 20 may include one or more processors (not shown) for controlling one or more of the data acquisition unit 260, the data processing unit 270, and the data output unit 280.

According to an embodiment, the data acquisition unit 260 may receive data from an external device. For example, the data acquisition unit 260 may acquire the voice data feature from the electronic device 10.

According to an embodiment, the data processing unit 270 may process the acquired data and generate new data using the acquired data. For example, the data processing unit 270 may generate the output voice data using the acquired voice data feature in a situation of generating the output voice data.

According to an embodiment, the data output unit 280 may output the data processed or newly generated by the data processing unit 270 to outside. For example, the data output unit 280 may transmit the generated output voice data to an external device.

Figure 3:
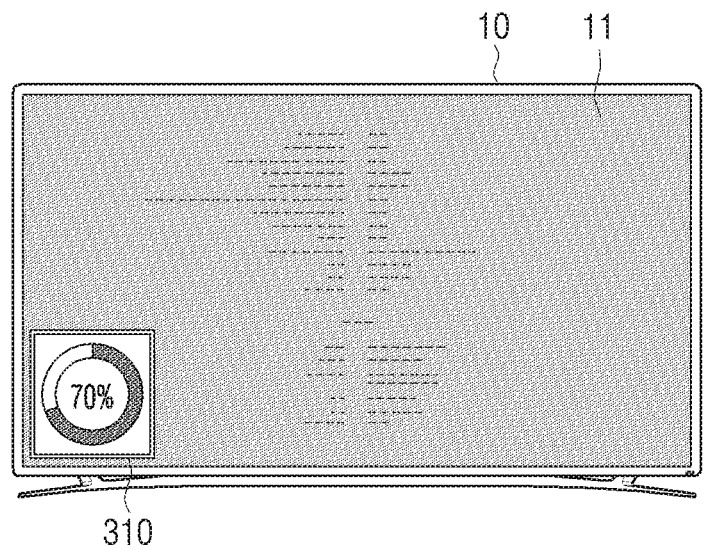
FIG. 3 is a view illustrating a situation in which the electronic device displays a degree of voice data collection according to an embodiment of the disclosure.

FIG. 3 is a view illustrating a situation in which the electronic device displays a degree of voice data collection according to an embodiment of the disclosure.

According to one embodiment, the electronic device 10 may transmit the voice data feature obtained from the voice data to the server 20. The server 20 may identify whether the voice data feature is acquired at a level capable of generating the voice data for output using the acquired voice data feature. For example, the server 20 may identify whether the amount of the obtained voice data feature is included in the predetermined range. For example, the server 20 may identify whether at least three or more voice data features are acquired. Alternatively, the server 20 may identify, for example, whether each voice data feature is acquired by a predetermined number or more or by a predetermined amount of data or more.

According to one embodiment, the server 20 may transmit, to the electronic device 10, a voice data feature collecting level that includes information about whether the voice data feature has been acquired at a level for generating the voice data for output using the voice data feature from the electronic device 10. The voice data feature collecting level may, for example, represent the currently obtained level, assuming that the level at which voice data for output may be generated by using the voice data feature as 100%.

Referring to FIG. 3, the electronic device 10 may display the degree of the voice data feature collection received from the server 20 on the display 11. For example, the electronic device 10 may display a degree 310 of collecting the voice data feature on a part of the display 11, at a point of time when the playback of the media content ends.

According to various embodiments, the electronic device 10 may perform an action of the server 20 as described above in the electronic device 10. That is, the electronic device 10 may identify the degree of the voice data feature collection. The electronic device 10 may display the degree of the voice data feature collection on the display 11.

FIG. 4 is a view to describe a situation of providing another media content for acquiring voice data feature by an electronic device or acquiring voice data feature by another electronic device according to an embodiment of the disclosure.

According to an embodiment, when the degree of the voice data feature collection does not reach a preset level (for example: 100%), the server 20 may acquire the media content for acquiring the voice data feature more, in link with another server providing the media content. For example, by using the feature point of a face obtained from an image of the person C, the server 20 may acquire another media content in which the person C appears from another server and transmit the same to the electronic device 10.

According to various embodiments, when the degree of the voice data feature collection received from the server 20 does not reach the preset level (for example: 100%), the electronic device 10 may further transmit a command, to the server 20, requesting to acquire other media content for acquiring the voice data feature more. The server 20 may acquire other media content that can acquire the voice data feature more, in link with another server providing the media content in response to the instruction received from the electronic device 10 and transmit the acquired media content to the electronic device 10.

Referring to 4-a of FIG. 4, the electronic device 10 may receive information about the other media content which may further acquire the voice data feature from the server 20. For example, the server 20 may transmit, to the electronic device 10, a representative image 410 of the other media content in which the person C 430 appears. The representative image 410 may include link information about other media content in which the person C appears.

According to various embodiments, the electronic device 10 may display the degree of collection of the voice data feature described above in FIG. 3 on the display 11, and then, or sequentially, display the representative image 410 of the media content in which the person C appears, received from the server 20, on an area of the display 11.

According to various embodiments, the electronic device 10 may perform the aforementioned action of the electronic device 10 in the electronic device 10. In other words, the electronic device 10 may obtain different media content in which the voice data feature may be further obtained by being linked with another server which provides the media content, and display a representative image of the obtained other media content on the display 11.

According to an embodiment, the server 20 may store a personal account of a user in order to support a personal assistant function. Accordingly, the server 20 may support a personal assistant function using various electronic devices. The server 20 may acquire voice data feature on other electronic devices of the user using the personal account of the user. According to various embodiment, the electronic device 10, the server 20, and other electronic devices may regularly transmit and receive data by using a personal account of the user.

Referring to 4-b of FIG. 4, the other electronic device 420 of the user may play back the media content. For example, the user may subsequently watch the media content which the user watched using the electronic device 10 via the other electronic device 420 in link with the personal account of the user.

According to an embodiment, when the voice data feature collection level does not reach a preset level (for example, 100%) the server 20 may instruct the other electronic device 420 in link with the personal account of the user to acquire the information of a person relating to the person C 430 and the voice data feature of the person C 430.

According to various embodiments, when the voice data feature collection level received from the server 20 does not reach a predetermined level (e.g., 100%), the electronic device 10 may instruct the other electronic device 420 to proceed with acquiring of the voice data feature for person C 430 along with the information of a person relating to the person C 430.

The other electronic device 420 may, by using the feature point of the face of the person C 430 received from the server 20 or the electronic device 10, identify whether a person 440 who is the same as the person C 430 appears, among the persons appearing in the media content played back in the other electronic device 420. If it is identified that the person 440 same as the person C 430 appears, the other electronic device 420 may acquire the voice data uttered by the person 440 that is the same person C 430, acquire the voice data feature from the voice data, and transmit the same to the server 20.

According to an embodiment of the disclosure, the electronic device 10 may display, on the display 11, information on other media content, which may acquire the voice data feature received from the server 20. In addition, the server 20 may acquire the voice data feature even in the media content played back by the other electronic device 420 of the user. Accordingly, the electronic device 10 and the server 20 may improve the accuracy of the voice change of the personal assistant function.

In addition, when a user watches media content using the other electronic device 420, the other electronic device 420 may acquire the voice data feature for a pre-selected person of interest, without a necessity to newly selecting a person of interest.

Figure 5:
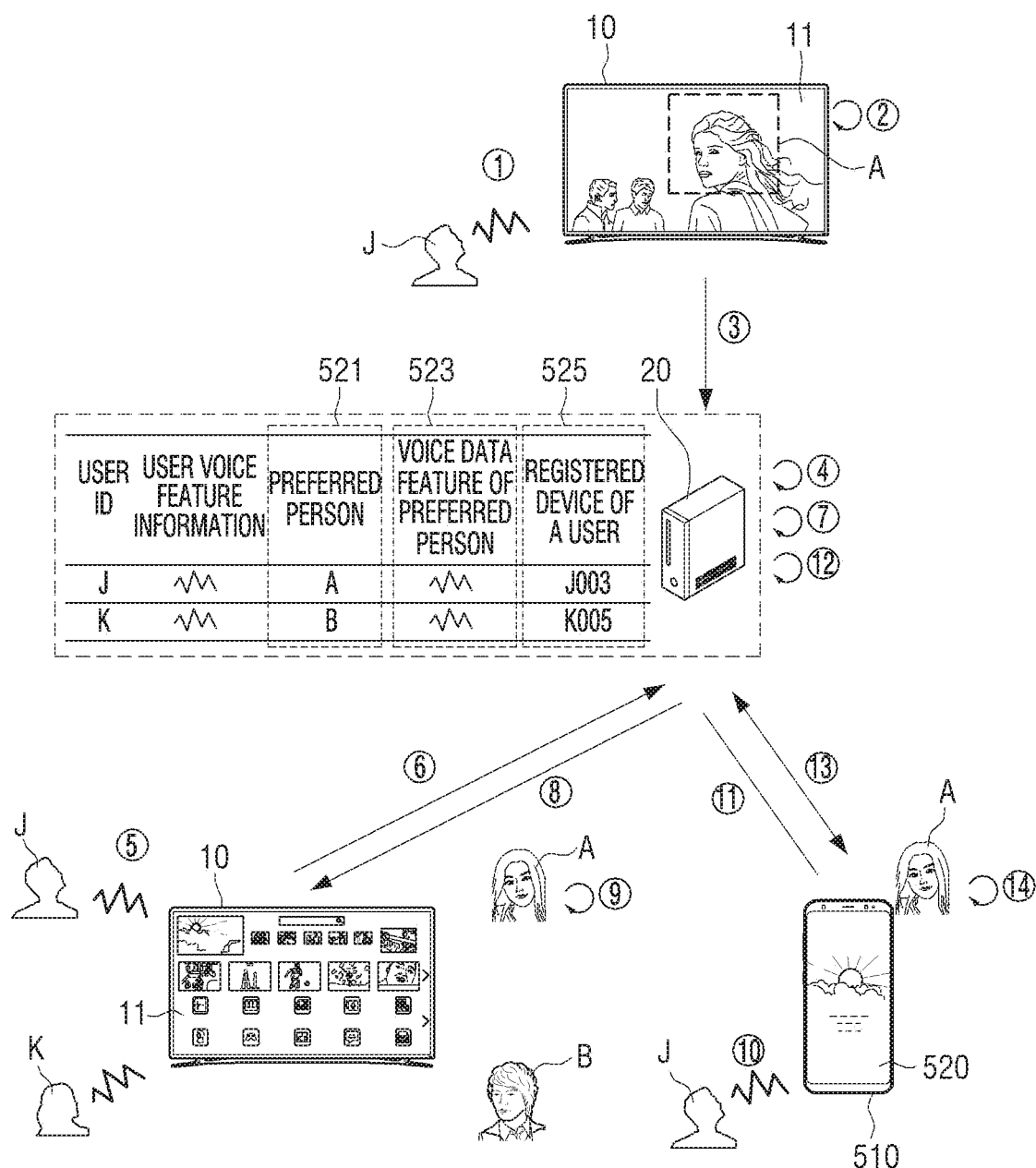
FIG. 5 is a view to describe a situation of setting a voice which is outputted by a personal assistant function according to users by the electronic device according to an embodiment of the disclosure.

FIG. 5 is a view to describe a situation of setting a voice which is outputted by a personal assistant function according to users by the electronic device according to an embodiment of the disclosure.

Referring to action ①, the electronic device 10 may receive a command of the user J requesting acquisition of the voice data feature for an object included in the media content displayed on the display 11. For example, the electronic device 10 may obtain the utterance of the user J. The utterance of the user J may be, for example, content that requests acquisition of the voice data feature for an object currently displayed by the electronic device 10 to modulate the voice outputted by the personal assistant.

Referring to action ②, the electronic device 10 may identify the user using the voice feature of the user voice acquired from the utterance of the user J. Based on the contents of the utterance, the electronic device 10 may also execute the path rule by generating (or selecting) the path rule to acquire the voice data feature for the object currently displayed in the display 11, based on the contents of the utterance.

For example, the electronic device 10 may acquire the features associated with the person A displayed on the display 11. The electronic device 10 may acquire the feature points of the face in the image of the person A. The electronic device 10 may identify the scene in which the person A appears during the playback of the media content using the acquired feature points the face. When the person A appears, the electronic device 10 may recognize the face, and may identify the utterance period of the person A by using the change of the mouth shape of the person A. The electronic device 10 may acquire the voice data outputted by the media content while the person A is giving utterance.

According to an embodiment, the electronic device 10 may acquire the voice data feature from the acquired voice data of the person A. The voice data feature may be, for example, at least one of a voice frequency, a kind of voice, a sound velocity, and a pitch. The electronic device 10 may, for example, acquire the voice data feature in the voice data of the person A.

Referring to action ③, the electronic device 10 may make the acquired voice data feature of the person A correspond to the user J and transmit the voice data feature to the server 20. The server 20 may provide a personal assistant function to correspond to the account of the user J.

Referring to action ④, the server 20 may store the received voice data features of the person A to correspond to the account of the user J. According to various embodiments, the server 20 may store a person 521 preferred by the user, the voice data feature 520 of the preferred person, and a registered device of a user 525 (for example: other electronic devices of a user for using a personal assistant function).

Referring to action ⑤, the electronic device 10 may acquire utterance of the user J. For example, the electronic device 10 may acquire utterance of the user J requesting the search of a specific medic content.

Referring to action ⑥, the electronic device 10 may transmit the acquired utterance to the server 20.

Referring to action ⑦, the server 20 may change the acquired utterance to the text data, and generate the path rule to proceed with searching for a specific media content designated by the user J based on the text data. The server 20 may search for a media content designated by the user using another server providing the media content to the electronic device 10.

According to an embodiment, the server 20 may generate the voice data for output notifying the user J that the search is in progress and transmit the voice data to the electronic device 10. In this case, the server 20 may generate the voice data for output using the voice data feature acquired by action ④ and transmit the voice data to the electronic device 10.

For example, the server 20 may generate the voice data for output notifying that the search is in progress using the voice data feature of the person A stored in the personal account of the user J and transmit the voice data to the electronic device 10. The electronic device 10 may output the received output voice data.

Referring to action ⑧, the server 20 may transmit the searched result to the electronic device 10.

In this case, the server 20 may generate the output voice data notifying that the search result is being displayed on the display 11 using the voice data feature of the person A stored in the personal account of the user J and transmit the voice data to the electronic device 10.

Referring to action ⑨, the electronic device 10 may display the acquired search result on the display 11.

In this case, the electronic device 10 may output the output voice data notifying that the search result is displayed on the display 11 as the voice of the person A simultaneously with the display of the search result or sequentially.

According to various embodiments, the electronic device 10 may acquire an utterance of the user K requesting search of specific media content. In this case, the server 20 may generate output voice data to notify the user K that the search is currently in progress, and may transmit the voice data to the electronic device 10. In this case, the server 20 may generate the output voice data using the voice data feature of the person B stored to correspond to the user K and transmit the voice data to the electronic device 10.

In addition, the server 20 may transmit the search result to the electronic device 10 and, simultaneously or sequentially, display the output voice data notifying that the search result is displayed on the display 11 using the voice data feature of the person B and transmit the voice data to the electronic device 10. The electronic device 10 may output the received output voice data as the voice of the person B while displaying the acquired search result on the display 11.

Referring to action to ⑩, the other electronic device 10 of the user may acquire the utterance of the user J. For example, the utterance of the user J requesting the weather information may be acquired.

Referring to action ⑪, the electronic device 10 may transmit the acquired utterance to the server 20.

Referring to action ⑫, the server 20 may change the acquired utterance to the text data, and generate the path rule to proceed with the weather information search requested by the user J based on the text data. The server 20 may acquire weather information using another server providing the weather information.

According to an embodiment, the server 20 may identify that the other electronic device 510 is a device registered to correspond to the account of the user J. Therefore, the server 20 may generate the output voice data notifying that the weather information search is currently in progress using the voice data feature of the person A and transmit the voice data to the other electronic device 510.

Referring to action ⑬, the server 20 may transmit the searched result to the other electronic device 510.

In this case, the server 20 may generate the output voice data for the weather information using the voice data feature of the person A stored to correspond to the personal account of the user J and transmit the voice data to the other electronic device 510.

Referring to action ⑭, the other electronic device 510 may display the acquired search result on a display 520.

In this case, the other electronic device 510 may output the weather information as the voice of the person A simultaneously with the acquired weather information or sequentially.

As described above, according to an embodiment, a personal assistant function as a voice of a person preferred by a user may be provided using the voice data feature of a person preferred by each user.

Figure 6:
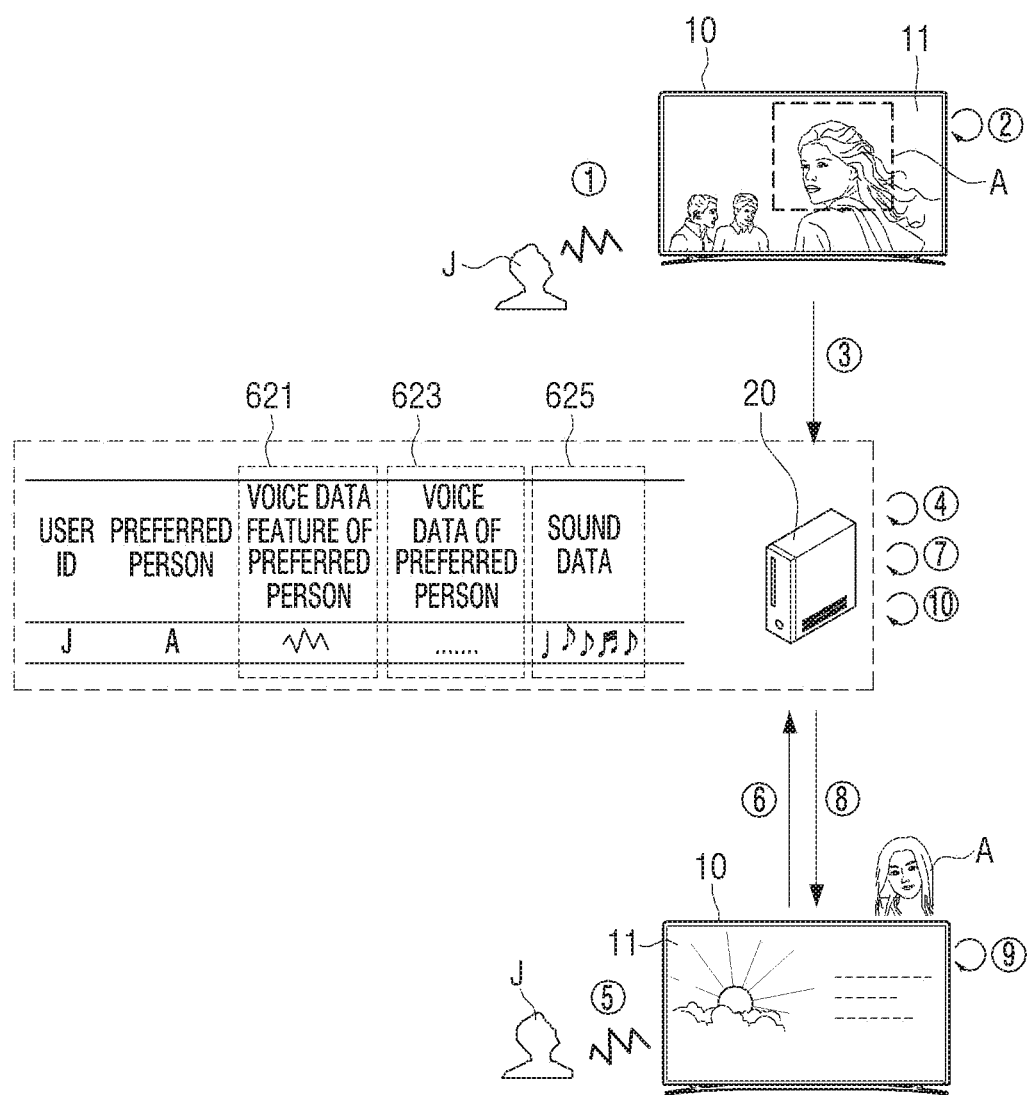
FIG. 6 is a view to describe a situation of replying by the electronic device using dialogue of a person preferred by a user according to an embodiment of the disclosure.

FIG. 6 is a view to describe a situation of replying by the electronic device using dialogue of a person preferred by a user according to an embodiment of the disclosure.

Referring to action ①, the electronic device 10 may receive a command of the user J requesting acquisition of the voice data for an object included in the media content displayed on the display 11. For example, the electronic device 10 may acquire utterance of the user J. The utterance of the user J may be, for example, a content to request acquisition of the voice data feature of the object displayed by the electronic device 10 to modulate the voice outputted by the personal assistant.

Referring to action ②, the electronic device 10 may identify the user using the utterance of the user J. Alternatively, the electronic device 10 may generate (or select) the path rule to acquire the voice data feature for the object currently displayed on the display, based on the content of the utterance, and execute the path rule.

For example, the electronic device 10 may acquire the feature associated with the person A displayed on the display 11. The electronic device 10 may acquire the feature points of the face in the image of the person A. The electronic device 10 may identify a scene in which the person A appears during the playback of the media content using the acquired feature points of the face. When the person A appears, the electronic device 10 may recognize the face and identify the utterance period of the person A by using the change in the mouth shape. The electronic device 10 may acquire voice data outputted by the media content while the person A is giving utterance.

According to one embodiment, the electronic device 10 may acquire voice data feature from the acquired voice data of the person A. The voice data feature may be at least one of, for example, a voice frequency, a kind of voice, a sound velocity, and a pitch. The electronic device 10 may acquire the voice data feature from, for example, the voice data of the person A.

According to various embodiments, the electronic device 10 may acquire sound data outputted by the media content in a scene where the person A appears. The sound data may be, for example, music outputted from a media content that is separate from the utterance of the person A, or ambient noise.

Referring to action ③, the electronic device 10 may make the acquired voice data feature of the person A correspond to the user J and transmit the voice data feature to the server 20. The electronic device 10 may make the voice data and sound data of the person A correspond to the user J and transmit the data to the server 20. The server 20 may support a personal assistant function to correspond to the account of the user J.

Referring to action ④, the server 20 may store received voice data 621, voice data feature 623, and sound data 625 of the person A to correspond to the account of the user J. In accordance with various embodiments, the server 20 may store a person preferred by the user, the voice data feature of the person preferred by the user, and a device registered by the user (e.g., other electronic devices for using a personal assistant function by the user).

Referring to action ⑤, the electronic device 10 may acquire utterance of the user J. For example, the electronic device 10 may acquire utterance of the user J requesting weather information.

Referring to action ⑥, the electronic device 10 may transmit the acquired utterance to the server 20.

Referring to action ⑦, the server 20 may change the acquired utterance to the text data and generate the path rule to proceed with the search of the weather information requested by the user J based on the text data. The server 20 may search for the weather information requested by the user using another server providing weather information to the electronic device 10.

According to an embodiment, the server 20 may transmit the voice data notifying the user J that the search is currently in progress to the electronic device 10. In this case, the server 20 may use the voice data acquired in action ④.

For example, the server 20 may identify the voice data related to the search among the voice data of the person A stored in the personal account of the user J, and transmit the identified voice data to the electronic device 10. The electronic device 10 may output the received voice data of the person A. However, the embodiment is not limited thereto. For example, when the server 20 may not identify the voice data related to the search among the voice data of the person A stored in the account of the user J, the server 20 may generate the output voice data notifying that the search is currently in progress using the voice data feature of the person A and transmit the voice data to the electronic device 10.

Referring to action ⑧, the server 20 may transmit the searched result to the electronic device 10.

In this case, the server 20 may transmit the voice data of the person A stored in the personal account of the user J to the electronic device 10. For example, the server 20 may identify the voice data related to the searched weather among the voice data of the person A stored in the personal account of the user J, and transmit the identified voice data to the electronic device 10, but it is not limited thereto. For example, when the server 20 may not identify the voice data related to the searched weather among the voice data of the person A stored in the personal account of the user J, the server 20 may generate the output voice data related to the searched weather using the voice data feature of the person A and transmit the voice data to the electronic device 10.

According to the various embodiments, when the user J has a conversation with the person A stored in the personal account regarding weather from among sound data related to the person A, the server 20 may identify the sound data which is outputted and transmit the identified sound data to the electronic device 10.

Referring to action ⑨, the electronic device 10 may display the acquired search result on the display 11.

In this case, the electronic device 10 may output the received voice data of the person A related to the searched weather simultaneously with the displayed search result or sequentially. In addition, the electronic device 10 may output the received sound data as well.

Referring to action ⑩, the server 20 may update the voice data or voice data feature stored to correspond to the account of the user J. In particular, the server 20 may determine the contents of the data that need to be updated. For example, in the actions CD and CD, when the server 20 cannot identify suitable voice data among the voice data of the person A stored in the account of the user J and generate the output voice data using the voice data feature of the person A, the server 20 may identify that the addition of the voice data of the person A is necessary and determine the content of the data that needs to be updated.

According to one embodiment, the server 20 may determine the update of the voice data of the person A that includes the same or similar content as the output voice data generated using the voice data feature of the person A. For example, when the server 20 cannot identify the voice data of the person A related to the weather and generate the output voice data using the voice data feature of the person A, the server 20 may determine to add voice data similar to the generated voice data.

According to various embodiments, the server 20 may determine the update of the voice data that the person A utters in correspondence with the same or similar content as the utterance of the user J. For example, the server 20 may determine to add, as the voice data, the utterances answered by the person A in response to an utterance similar to the utterance of the user J associated with the weather in the media content.

Figure 7:
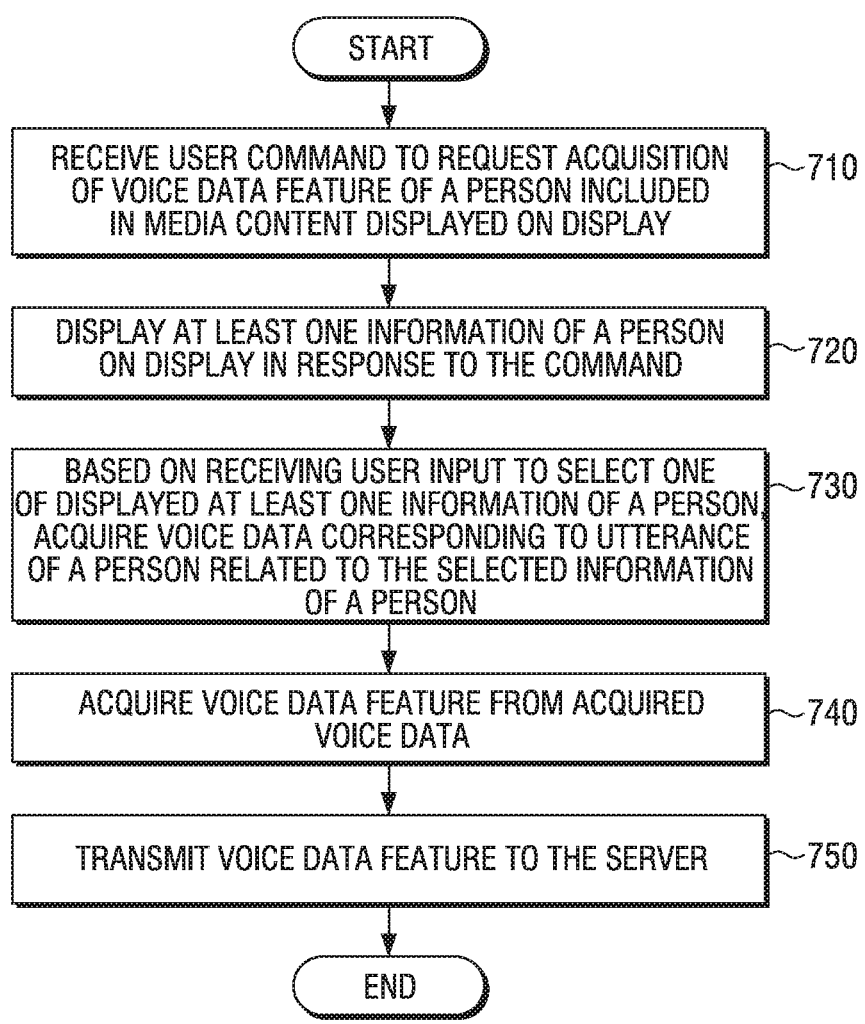
FIG. 7 is a flowchart to describe a situation of acquiring the voice data feature from a media content by the electronic device and transmitting the feature to the server according to an embodiment of the disclosure.

FIG. 7 is a flowchart to describe a situation of acquiring the voice data feature from a media content by the electronic device and transmitting the feature to the server according to an embodiment of the disclosure.

Referring to operation at S710, the electronic device 10 may receive a user command to request acquisition of the voice data feature of a person included in the media content displayed on the display.

According to one embodiment, the electronic device 10 may execute an application for searching for information related to various objects included in the media content being played back on the display, and display at least one information search object. For example, the electronic device 10 may display a search object for searching for information of a person, a search object for searching for product information, and a search object for searching for place information.

According to an embodiment, the electronic device 10 may receive a user input to select a search object for searching for information of a person from among the information search objects. The user input may be generated using, for example, a smartphone, a remote controller, or the like, or generated by receiving the user's utterance or recognizing the content of the utterance.

Referring to operation at S720, the electronic device 10 may display at least one information of a person on the display, in response to the command.

According to one embodiment, the electronic device 10 may acquire the information of a person included in the media content using automatic content recognition (ACR) technology. The information of a person may include, for example, an image of the person, a name of the person, a profile of the person, a frequency of emergence of the person in the media content, and the like. The electronic device 10 may, for example, display the name or image of the person on the display in the order of the frequency of emergence of the person.

Referring to operation at S730, when the user input to select one of the displayed at least one information of a person is received, the electronic device 10 may acquire voice data corresponding to the utterance of the person related to the selected information of a person.

According to an embodiment, the electronic device 10 may identify the feature related to the selected information of a person and acquire the feature related to the identified person. For example, the electronic device 10 may acquire the feature points of the face in the image of the selected person.

According to one embodiment, the electronic device 10 may identify the scene in which the selected person appears during the playback of the media content using the acquired feature points of the face. When the selected person appears, the electronic device 10 may recognize the face, and identify the utterance period of the selected person using the change in the mouth shape of the selected person. The electronic device 10 may acquire voice data outputted by the media content while the selected person is giving utterance.

Referring to operation at S740, the electronic device 10 may acquire the voice data feature from the acquired voice data.

The voice data feature may be at least one of, for example, voice frequency, kinds of voice, voice velocity, and pitch.

Referring to operation at S750, the electronic device 10 may transmit the voice data feature to the server.

Figure 8:
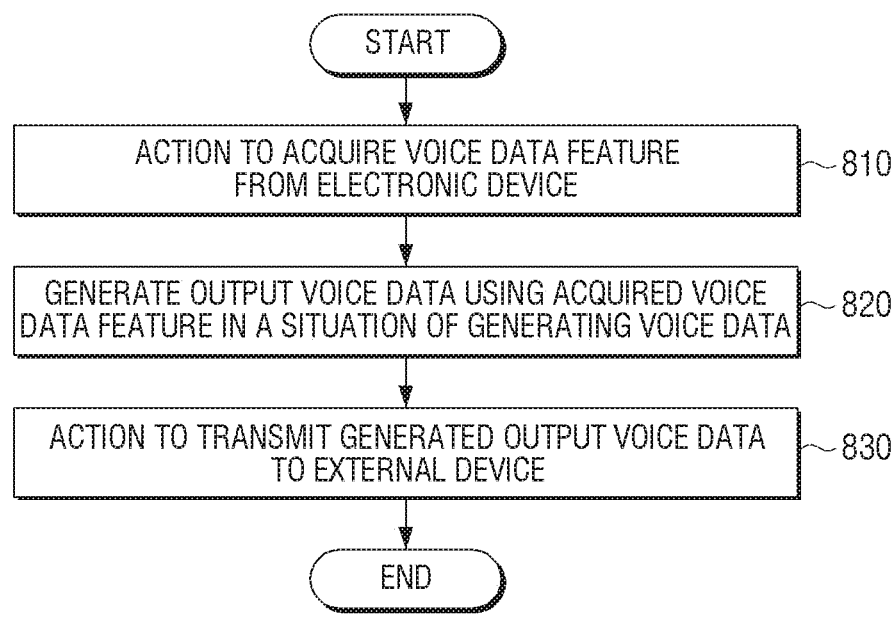
FIG. 8 is a flowchart to describe a situation of generating voice data by the server using the voice data feature and transmitting the voice data to the external device according to an embodiment of the disclosure.

FIG. 8 is a flowchart to describe a situation of generating voice data by the server using the voice data feature and transmitting the voice data to the external device according to an embodiment of the disclosure.

Referring to operation at S810, the server 20 may acquire the voice data feature from the electronic device 10.

According to one embodiment, the server 20 may store the user's personal account to support the personal assistant function. For this reason, the server 20 may support the user to use personal assistant function using various electronic devices (e.g., a smartphone, a tablet PC, an AI speaker, etc.). The server 20 may store the voice data features transmitted from the electronic device 10 in correspondence with the account of the user.

Referring to operation at S820, in the situation to generate the voice data, the server 20 may generate the output voice data using the acquired voice data feature.

According to one embodiment, the server 20 may obtain the user's utterance from the electronic device 10. The server 20 may change the acquired utterance to text data and generate (or select) the path rule corresponding to the user's command based on the text data. The server 20 may generate output voice data in accordance with the path rule. In this case, the server 20 may generate output voice data using the voice data feature acquired from the electronic device 10. That is, the server 20 may generate the output voice data that is the same as or similar to the voice of the person selected by the user.

Referring to operation at S830, the server 20 may transmit the generated output voice data to an external device.

The external device may be, for example, devices which include the electronic device 10 and enables a user to use a personal assistant function using a user's account.

Figure 9:
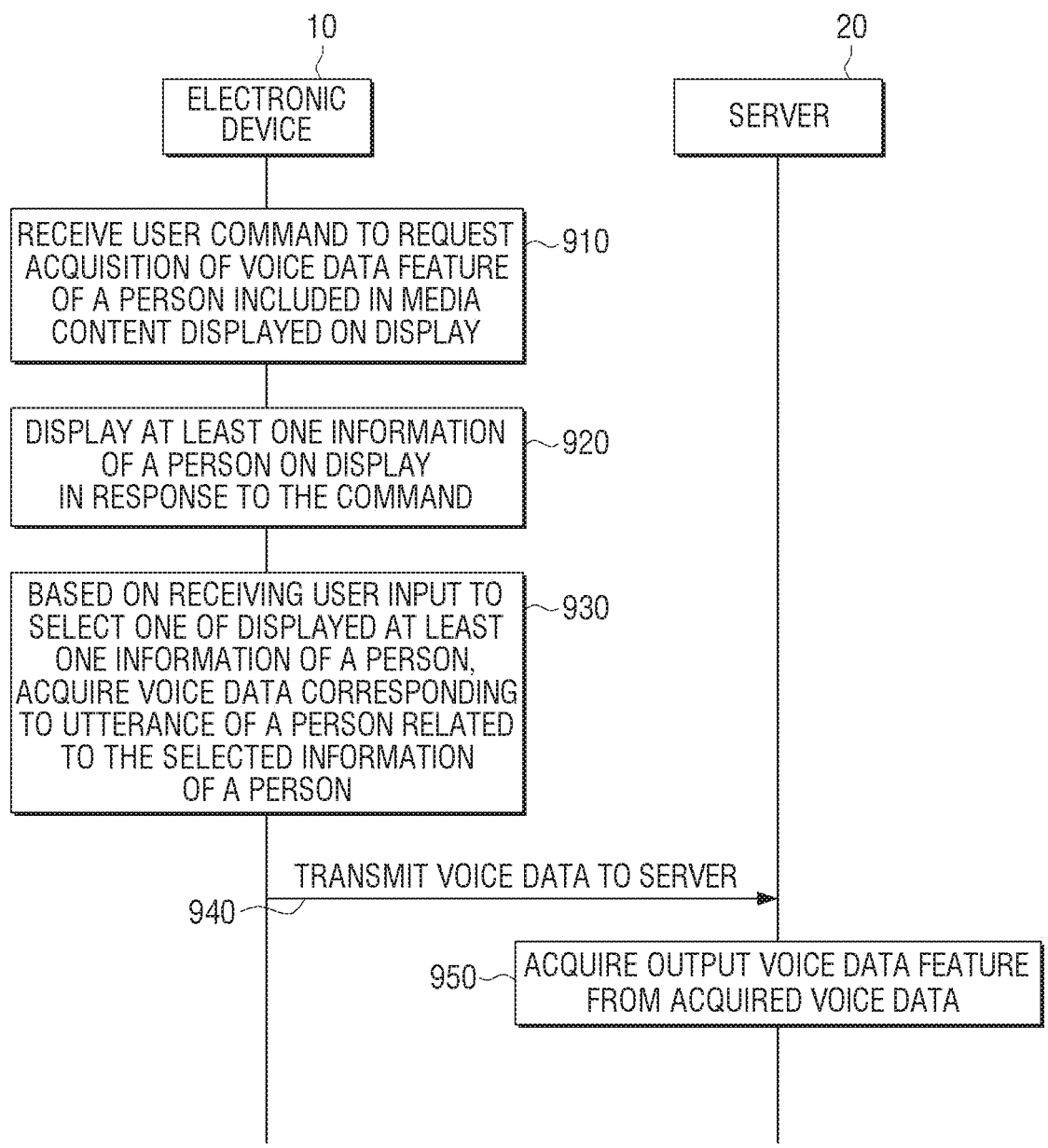
FIG. 9 is a flowchart to describe a situation of acquiring voice data feature from voice data by the server according to an embodiment of the disclosure.

FIG. 9 is a flowchart to describe a situation of acquiring voice data feature from voice data by the server according to an embodiment of the disclosure.

Referring to operation at S910, the electronic device 10 may receive a user command to request acquisition of the voice data feature of the person included in the media content displayed on the display.

According to one embodiment, the electronic device 10 may execute an application for searching for information related to various objects included in the media content being played back on the display, and display at least one information search object. For example, the electronic device 10 may display a search object for searching information of a person, a search object for searching for product information, and a search object for searching for place information. The electronic device 10 may receive a user input for selecting a search object for searching for information of a person among the information search objects.

Referring to operation at S920, the electronic device 10 may display at least one information of a person on the display in response to the command.

According to one embodiment, the electronic device 10 may acquire information of a person included in the media content using automatic content recognition (ACR) technology. The information of a person may include, for example, an image of the person, a name of the person, a profile of the person, a frequency of emergence of the person in the media content, and the like. The electronic device 10 may display the name or image of the person on the display in the order of, for example, the emergence frequency of the person.

Referring to operation at S930, when receiving the user input to select one of the displayed at least one information of a person, the electronic device 10 may acquire the voice data corresponding to the utterance of the person related to the selected information of a person.

According to one embodiment, the electronic device 10 may identify a person associated with the selected information of a person and acquire the features associated with the identified person. For example, the electronic device 10 may acquire feature points of the face in an image of the selected person. The electronic device 10 may identify a scene in which the selected person appears during the playback of the media content using the acquired feature points of the face. For example, when the selected person appears, the electronic device 10 may recognize the face and identify the person's utterance period using the change in mouth shape of the selected person. The electronic device 10 may acquire voice data outputted by the media content while the selected person is giving utterance.

Referring to operation at S940, the electronic device 10 may transmit the acquired voice data to the server 20.

Referring to operation at S950, the server 20 may acquire the voice data feature from the acquired voice data.

According to an embodiment, the server 20 may store a personal account of the user to support the personal assistant function. By this, the server 20 may support a user to use the personal assistant function using various electronic devices (for example, a smartphone, a tablet PC, an AI speaker, etc.). The server 20 may store the acquired voice data feature to correspond to the user account.

Figure 10:
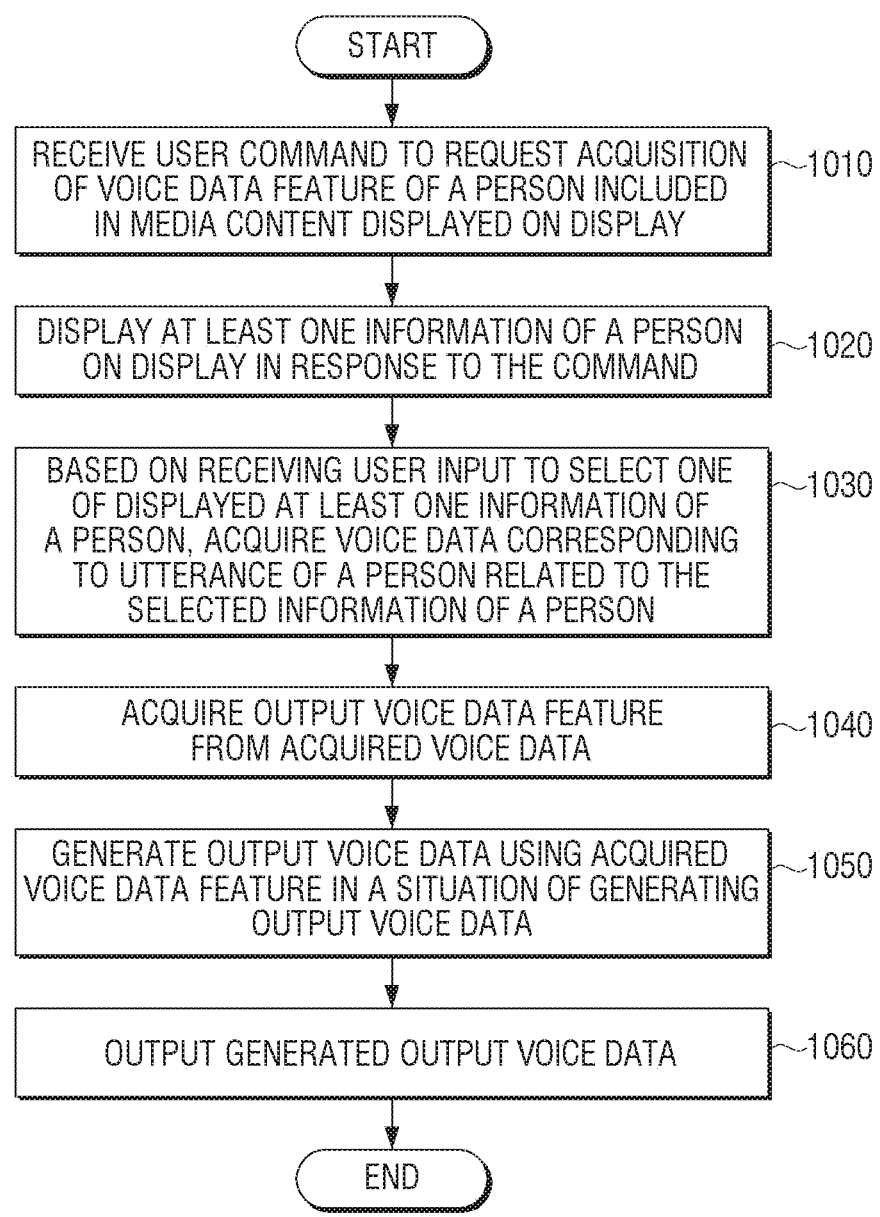
FIG. 10 is a flowchart to describe a situation of outputting voice data using voice data feature acquired by the electronic device according to an embodiment of the disclosure.

FIG. 10 is a flowchart to describe a situation of outputting voice data using voice data feature acquired by the electronic device according to an embodiment of the disclosure.

Referring to operation at S1010, the electronic device 10 may receive a user command to request acquisition of the voice data feature of the person included in the media content displayed on the display.

According to one embodiment, the electronic device 10 may display a search object for searching for information of a person, a search object for searching for product information, and a search object for searching for place information. The electronic device 10 may receive a user input for selecting a search object for searching for information of a person from the information search objects. The user input may be generated using, for example, a smart phone, a remote controller, or the like, or may be generated by receiving the user's utterance and recognizing the utterance.

Referring to operation at S1020, the electronic device 10 may display at least one information of a person on the display in response to the command.

The information of a person may include, for example, an image of a person, a name of a person, a profile of a person, and emergence frequency of a person in the media content, or the like. The electronic device 10, for example, may display a name or an image of a person in the order of emergence frequency of a person on the display.

Referring to operation at S1030, the electronic device 10, when a user input to select one of the displayed at least one information of a person is received, may acquire the voice data corresponding to the utterance of the person related to the selected information of a person.

According to an embodiment, the electronic device 10 may identify the person related to the selected information of a person and acquire the feature related to the identified person. For example, the electronic device 10 may acquire the feature points of the face in the image of the selected person.

According to one embodiment, the electronic device 10 may identify a scene in which a selected person appears during playback of the media content using the acquired feature points of the face. When the selected person appears, the electronic device 10 may recognize the face, and identify the utterance period of the selected person using the change in the mouth shape of the selected person. The electronic device 10 may acquire voice data which is outputted by the media content while the selected person is giving utterance.

Referring to operation at S1040, the electronic device 10 may acquire the voice data feature from the acquired voice data.

The voice data feature may be at least one of, for example, voice frequency, kinds of voice, voice velocity, and pitch.

Referring to operation at S1050, while the output voice data is being generated, the electronic device 10 may generate the output voice data using the acquired voice data feature.

According to one embodiment, the electronic device 10 may acquire a user's utterance. The electronic device 10 may change the acquired utterance to text data and generate (or select) the path rule corresponding to the user's command based on the text data. The electronic device 10 may generate output voice data in accordance with the path rule. In this case, the electronic device 10 may generate output voice data using the voice data feature. That is, the electronic device 10 may generate output voice data that is the same as or similar to the voice of the person selected by the user.

Referring to operation at S1060, the electronic device 10 may output the generated output data.

Figure 11:
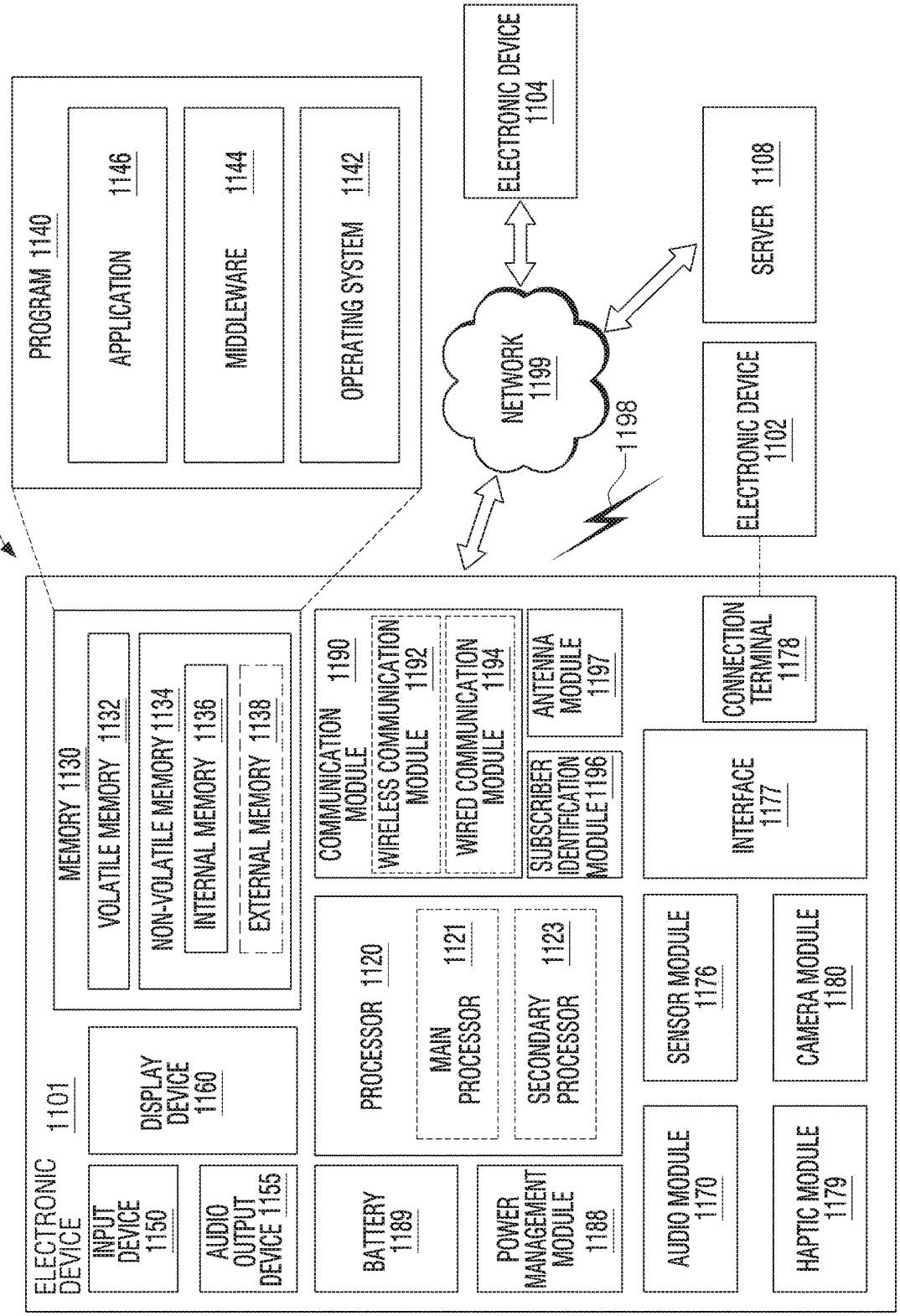
FIG. 11 is a block diagram of the electronic device in a network environment according to an embodiment of the disclosure.

FIG. 11 is a block diagram of the electronic device 1101 in a network environment 1100 according to various embodiments of the disclosure.

An electronic device 1101 may include the electronic device 10 of FIG. 1, the other electronic device 420 of FIG. 4, and the electronic device 510 of FIG. 11.

Referring to FIG. 11, the electronic device 1101 in a network environment 1100 may communicate with an electronic device 1102 via a first network 1198 (e.g., a short-range wireless communication network) or communicate with an electronic device 1104 or a server 1108 via a second network 1199 (e.g., wide area network). According to one embodiment, the electronic device 1101 may communicate with the electronic device 1104 via the server 1108. According to one embodiment, the electronic device 1101 may include a processor 1120, a memory 1130, an input device 1150, an audio output device 1155, a display device 1160, an audio module 1170, a sensor module 1176, an interface 1177, a haptic module 1179, a camera module 1180, a power management module 1188, a battery 1189, a communication module 1190 (e.g., a transceiver), a subscriber identification module 1196, or an antenna module 1197. In some embodiments, at least one (e.g., display device 1160 or camera module 1180) of these components may be omitted from electronic device 1101, or one or more other components may be added. In some embodiments, some of these components may be implemented as a single integrated circuit. For example, the sensor module 1176 (e.g., a fingerprint sensor, an iris sensor, or an illumination sensor) may be implemented to be embedded in the display device 1160 (e.g., a display).

The processor 1120 may control the at least one another component (e.g., hardware or software component) of the electronic device 1101 connected to the processor 1120 by executing the software (e.g., the program 1140) and perform various data processing or operation. According to an embodiment, as at least a part of the data processing or operation, the processor 1120 may load the command or data received from another component (e.g., the sensor module 1176 or the communication module 1190) to a volatile memory 1132, process command or data stored in the volatile memory 1132, and store the result data in a non-volatile memory 1134. According to one embodiment, the processor 1120 may include a main processor 1121 (e.g., a central processing unit or an application processor), and a secondary processor 1123 (e.g., a graphics processing unit, an image signal processor, a sensor hub processor, or a communication processor) which may be operated together or independently. Additionally or alternatively, the secondary processor 1123 may use less power than the main processor 1121, or may be set to be specialized to a designated function. The secondary processor 1123 may be implemented separately from, or as a part of, the main processor 1121.

The secondary processor 1123 may, for example, in place of the main processor 1121 while the main processor 1121 is in an inactive state (for example: sleep) or along with the main processor 1121 while the main processor 1121 is in an active state (for example: execution of an application) control a part of the functions or states related to at least one component (for example: display device 1160, the sensor module 1176, or the communication module 1190) among the components of the electronic device 1101. According to one embodiment, the secondary processor 1123 (e.g., an image signal processor or a communication processor) may be implemented as a part of a functionally related other components (e.g., camera module 1180 or communication module 1190).

The memory 1130 may store various data used by at least one component (e.g., processor 1120 or sensor module 1176) of the electronic device 1101. The data may include, for example, software (e.g., program 1140) and input data or output data related with software instructions. The memory 1130 may include the volatile memory 1132 or non-volatile memory 1134.

The program 1140 may be stored in the memory 1130 as software, and include, for example, an operating system 1142, middleware 1144, or an application 1146.

The input device 1150 may receive a command or data to be used for the components (e.g., processor 1120) of the electronic device 1101 from the outside (e.g., user) of the electronic device 1101. The input device 1150 may include, for example, a microphone, a mouse, or a keyboard.

The sound output device 1155 may output a sound signal to the outside of the electronic device 1101. The sound output device 1155 may include, for example, a speaker or a receiver. The speaker may be used for general purposes, such as multimedia playback or recording playback, and the receiver may be used to receive incoming calls. According to one embodiment, the receiver may be implemented separately from, or as a part of, the speaker.

The display device 1160 may visually provide information to an outside (e.g., user) of the electronic device 1101. The display device 1160 may include, for example, a display, a hologram device, a projector, or a control circuit for controlling the device. According to an embodiment, the display device 1160 may include a touch circuitry which is set to detect a touch or a sensor circuit (e.g., a pressure sensor) which is set to measure intensity of power generated by the touch.

The audio module 1170 may convert sound into an electric signal, or convert an electric signal to sound. According to one embodiment, the audio module 1170 may acquire sound through an input device 1150, or output sound through the sound output device 1155, or an external electronic device (e.g., electronic device 1102) (e.g., speaker or headphone) which is directly or wirelessly connected to the electronic device 1101.

The sensor module 1176 may detect the operation state of the electronic device 1101 (e.g., power or temperature), or an external environment state (e.g., a user state), and generate an electrical signal or a data value corresponding to the detected state. According to an embodiment, the sensor module 1176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1177 may support one or more designated protocols that may be used by the electronic device 1101 to be connected directly or wirelessly to an external electronic device (e.g., electronic device 1102). According to an embodiment, the interface 1177 may include, for example, a high definition multimedia interface (HDMI), a universal serial bus (USB) interface, a secure digital (SD) card interface, or an audio interface.

A connection terminal 1178 may include a connector through which the electronic device 1101 may be physically connected to an external electronic device (e.g., the electronic device 1102). According to an embodiment, the connection terminal 1178 may include, for example, an HDMI connector, a USB connector, an SD card connector, or an audio connector (e.g., a headphone connector).

The haptic module 1179 may convert an electrical signal into a mechanical stimulus (e.g., vibration or motion) or an electrical stimulus that a user may recognize through a tactile or kinesthetic sense. According to an embodiment, the haptic module 1179 may include, for example, a motor, a piezoelectric element, or an electric stimulation device.

The camera module 1180 may photograph a still image or a moving image. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as, for example, at least a part of power management integrated circuit (PMIC).

The battery 1189 may supply power to at least one component of the electronic device 1101. According to an embodiment, the battery 1189 may include, for example, a non-rechargeable primary battery, a rechargeable secondary battery, or a fuel cell.

The communication module 1190 may support establishment of direct (e.g.: wired) communication channel between the electronic device 1101 and an external electronic device (e.g., electronic device 1102, electronic device 1104, or server 1108) or wireless communication channel, and communication through the established communication channels. The communication module 1190 may include one or more communication processors which are operated independently of the processor 1120 (e.g., application processor) and support direct (e.g., wired) communication or wireless communication. According to an embodiment, the communication module 1190 may include a wireless communication module 1192 (e.g., cellular communication module, near field wireless communication module, or global navigation satellite system (GNSS) communication module) or wired communication module 1194 (e.g., local area network (LAN) communication module, or power line communication module). The corresponding communication module among these communication modules may communicate with an external electronic device via the first network 1198 (e.g., Bluetooth, WiFi direct or near field communication network such as infrared data association (IrDA)) or the second network 1199 (e.g., telecommunication network such as cellular network, Internet, or computer network (e.g., LAN or WAN)). These types of communication modules may be incorporated into one component (e.g., a single chip) or implemented with a plurality of components (e.g., a plurality of chips) that are separate from each other. The wireless communication module 1192 may confirm and authenticate the electronic device 1101 in the communication network such as the first network 1198 or the second network 1199 using the subscriber information (e.g., international mobile subscriber identity (IMSI)) stored in the subscriber identification module 1196.

The antenna module 1197 may transmit a signal or power to an external device (e.g., an external electronic device) or receive a signal or power from the outside. According to one embodiment, the antenna module 1197 may include one or more antennas from which at least one antenna suitable for a communication method used in a communication network, such as the first network 1198 or the second network 1199, may be selected by, for example, the communication module 1190. A signal or power may be transmitted or received between the communication module 1190 and the external electronic device via the selected at least one antenna.

At least a part of the components may be interconnected through the communication method (e.g., bus, general purpose input and output (GPIO), serial peripheral interface (SPI), or mobile industry processor interface (MIPI)) among peripheral devices and exchange a signal (e.g., command or data) from each other.

According to one embodiment, the command or data may be transmitted or received between the electronic device 1101 and the external electronic device 1104 via the server 1108 connected to the second network 1199. Each of the electronic devices 1102 and 1104 may be devices which are the same or different types from the electronic device 1101. According to an embodiment, whole or a part of the operations executed by the electronic device 1101 may be executed by one or more external devices among the external electronic devices 1102, 1104, or 1108. For example, when the electronic device 1101 has to perform a function or service automatically, or in response to a request from a user or another device, the electronic device 1101 may request one or more external electronic devices to perform at least a part of the function or the service instead of, or in addition to, performing the function or service by itself. The one or more external electronic devices that have received the request may execute at least a portion of the requested function or service, or an additional function or service associated with the request, and transmit the result of the execution to the electronic device 1101. The electronic device 1101 may process the result as is or additionally, and provide the result as at least a portion of the response to the request. For this purpose, for example, cloud computing, distributed computing, or client-server computing technology may be used.

In this disclosure, the term "module" may include a unit implemented with hardware, software, or firmware. The term may be interchangeably used with terms, for example, logic, logic blocks, parts, or circuits. The module may be a part integrally formed or a minimum unit or a part of the part performing one or more functions. For example, according to one embodiment, the module may be implemented in the form of an application-specific integrated circuit (ASIC).

The various embodiments of the disclosure may be implemented with software (e.g., program 1140) including one or more instructions stored in the storage medium (e.g., internal memory 1136 or external memory 1138) readable by a machine (e.g., electronic device 1101). For example, the processor (e.g., processor 1120) of a device (e.g., electronic device 1101) may call at least one instruction among one or more instructions stored in the storage medium and execute the instructions. This enables a device to be operated to perform at least one function according to the called at least one instructions. The instructions may include a code generated by a compiler or executed by an interpreter. The storage medium readable by a machine may be provided in the form of a non-transitory storage medium, where "non-temporary" means that the storage medium is a tangible device and does not include a signal (e.g., electromagnetic wave). This term does not distinguish that data is permanently or temporarily stored in the storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

Each of the elements (for example, a module or a program) according to various embodiments may be composed of a single entity or a plurality of entities, and some sub-elements of the abovementioned sub-elements may be omitted. The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display;
    a transceiver;
    at least one processor; and
    a memory for storing commands executable by the at least one processor,
    wherein upon execution of the stored commands the at least one processor is configured to:
        based on a user command to request acquisition of a voice data feature of a plurality of people included in a media content displayed on the display being received, control the display to display information of the plurality of people,
        based on a user input to select the information of a person among the plurality of people being received, identify an utterance period of the person using a change of mouth shape of the person in the media content,
        acquire voice data corresponding to an utterance of the person related to the selected information of the person by acquiring voice data outputted by the media content during the utterance period,
        acquire the voice data feature from the acquired voice data,
        control the transceiver to transmit the acquired voice data feature to a server,
        acquire a voice data feature collection level including information on whether the voice data feature is acquired in a level capable of generating output voice data using the voice data feature from the server through the transceiver,
        based on identifying that the acquired voice data feature collection level has not reached a preset level, control the transceiver to receive information on another media content acquired by the server in response to a command to request acquiring another media content capable of acquiring the voice data feature.

2. The electronic device of claim 1, wherein upon execution of the stored commands the at least one processor is further configured to:
    acquire sound data which is different from the voice data, in response to a point of time when the person gives an utterance, and
    control the transceiver to transmit the voice data and the sound data to the server.

3. The electronic device of claim 1, wherein upon execution of the stored commands, based on receiving the user input to select the information of the person, the at least one processor is further configured to detect a person who is substantially identical with the person from the media content using a feature of a face of the person related to the selected information of the person and extract voice data to correspond to an utterance of the detected person.

4. The electronic device of claim 1, wherein upon execution of the stored commands, based on receiving a voice data feature collection level including information on whether the voice data feature is acquired in a level capable of generating output voice data using the voice data feature from the server through the transceiver, the at least one processor is further configured to control the display to display the voice data feature collection level.

5. The electronic device of claim 4, wherein upon execution of the stored commands, based on identifying that the received voice data feature collection level not reaching a preset level, the at least one processor is further configured to control the transceiver to transmit, to another electronic device, a command to request acquiring the selected information of the person and the voice data feature of the person.

6. The electronic device of claim 2,
    wherein the electronic device further comprises:
        a microphone; and
        a speaker, and
    wherein upon execution of the stored commands, based on receiving a user utterance through the microphone, the at least one processor is further configured to:
        control the transceiver to transmit the user utterance to the server,
        receive output voice data which is generated using the voice data feature by the server to correspond to the user utterance, and
        control the speaker to output the received output voice data.

7. The electronic device of claim 6,
    wherein the user includes a first user and a second user,
    wherein upon execution of the stored commands, based on receiving an utterance of the first user through the microphone, the at least one processor is further configured to control the transceiver to:
        transmit utterance of the first user to the server, and
        receive first output voice data which is generated by the server using a voice data feature stored to correspond to the first user in response to the utterance of the first user, and
    wherein upon execution of the stored commands, based on the utterance of the second user being received through the microphone, the at least one processor is further configured to control the transceiver to:
        transmit the utterance of the second user to the server, and
        receive a second output voice data which is generated by the server using a voice data feature stored to correspond to the second user in response to the utterance of the second user.

8. The electronic device of claim 6, wherein upon execution of the stored commands, based on receiving voice data selected by the server in response to the utterance by controlling the transceiver, the at least one processor is further configured to control the speaker to output the received voice data.

9. The electronic device of claim 6, wherein upon execution of the stored commands, based on receiving sound data selected by the server in response to the utterance by controlling the transceiver, the at least one processor is further configured to control the speaker to output the received sound data.

10. A server comprising:
at least one processor configured to:
control data acquisition to acquire a voice data feature of a person from an electronic device, voice data being acquired by the electronic device based on a user input to select an information of the person among a plurality of people included in a media content displayed on a display of the electronic device and to acquire information on another media content from another server,
control data processing to generate output voice data using the acquired voice data feature in a situation of generating voice data and generate a voice data feature collection level including information on whether the voice data feature is acquired in a level capable of generating the output voice data using the voice data feature,
control data output to transmit the generated output voice data to an external device, and
transmit the voice data feature collection level to the external device, and based on identifying that the transmitted voice data feature collection level has not reached a preset level, transmit the information on another media content to the electronic device, in response to a command to request acquiring another media content capable of acquiring the voice data feature,
wherein the acquiring of the voice data comprises identifying an utterance period of the person using a change of mouth shape of the person in the media content and acquiring voice data outputted by the media content during the utterance period.

11. A controlling method of an electronic device, the method comprising:
displaying information of a plurality of people on a display of the electronic device, based on receiving a user command to request acquisition of a voice data feature of the plurality of people included in a media content displayed on the display;
based on receiving a user input to select the information of a person among the plurality of people, identifying an utterance period of the person using a change of mouth shape of the person in the media content;
acquiring voice data corresponding to an utterance of the person related to the selected information of the person by acquiring voice data outputted by the media content during the utterance period;
acquiring the voice data feature from the acquired voice data;
transmitting the voice data feature to a server;
acquiring a voice data feature collection level including information on whether the voice data feature is acquired in a level capable of generating output voice data using the voice data feature from the server through the electronic device; and
based on identifying that the acquired voice data feature collection level has not reached a preset level, receiving information on another media content acquired by the server in response to a command to request acquiring another media content capable of acquiring the voice data feature.

12. The method of claim 11, further comprising:
acquiring sound data which is different from the voice data in response to a point of time when the person gives an utterance; and
transmitting the voice data and the sound data to the server.

13. The method of claim 11, further comprising:
based on receiving the user input to select the information of the person, detecting a person who is substantially identical with the person from the media content using a feature of a face of the person related to the selected information of the person; and
extracting voice data to correspond to a point of time of utterance of the detected person.

14. The method of claim 11, further comprising:
based on receiving a voice data feature collection level including information on whether the voice data feature is acquired in a level capable of generating output voice data using the voice data feature from the server, displaying the voice data feature collection level on the display.

15. The method of claim 14, further comprising:
based on identifying that the received voice data feature collection level not reaching a preset level, transmitting, to another electronic device, a command to request acquiring the selected information of the person and the voice data feature of the person.

16. The method of claim 12, further comprising:
based on receiving a user utterance, transmitting the user utterance to the server,
receiving output voice data which is generated using the voice data feature by the server to correspond to the user utterance, and
outputting the received output voice data.

17. The method of claim 16,
wherein the user includes a first user and a second user, and
wherein the method further comprises:
based on receiving an utterance of the first user, transmitting utterance of the first user to the server, and in response to utterance of the first user, receiving first output voice data which is generated by the server using a voice data feature stored to correspond to the first user in response to the utterance of the first user; and
based on the utterance of the second user being received, transmitting the utterance of the second user to the server, and in response to utterance of the second user, receiving a second output voice data which is generated by the server using a voice data feature stored to correspond to the second user.

18. The method of claim 11, further comprising:
displaying a degree of the acquiring of the voice data feature received from the server on the display.

* * * * *